INVENTOR
MICHAEL PALMER

BY
Smythe & Moore
ATTORNEYS

United States Patent Office 3,428,244
Patented Feb. 18, 1969

3,428,244
BLADED WHEELS
Michael Palmer, Berlin, Germany, assignor to Turbon Ventilatoren- und Apparatebau Gesellschaft mit beschrankter Haftung, Berlin, Germany, a company of Germany
Filed Oct. 21, 1966, Ser. No. 588,619
Claims priority, application Germany, Oct. 22, 1965, T 29,646; July 15, 1966, T 31,687; July 29, 1966, T 31,728
U.S. Cl. 230—134          19 Claims
Int. Cl. F04d 29/34, 29/40

ABSTRACT OF THE DISCLOSURE

A bladed wheel assembly for fans having a hub and an outer ring and wherein a spring clamp is arranged within the assembly and engages with feet on a plurality of blades and clamps the blades in position therewith.

---

This invention relates to bladed wheels, particularly for fans, with a hub, an outer ring surrounding the hub and a number of blades mounted between the hub and the outer rig, each blade having a foot which has an annular flange and is mounted either on the hub or on the outer ring rotatable about its longitudinal axis.

Bladed wheels of this kind are already known in which the blades are inserted in openings in the hub by means of threaded studs and are secured in place by nuts screwed tight inside. Apart form the fact that this kind of construction is comparatively expensive, it is at the same time not satisfactory because in practice it is not possible without using extra parts such as plate springs or the like to secure the blades in such a way that, on the one hand, they are not moved out of position during operation by the applied forces, and that on the other hand they remain adjustable by hand. A further disadvantage is that the threaded studs are sensitive to alternating loads and can in certain circumstances even fracture. Finally with this construction, assembly is expensive because each blade must be screwed tight independently.

Many attempts have been made to evolve bladed wheels in such a way that these disadvantages are at least partly eliminated. Thus bladed wheels are known in which the hub is split in the plane containing the centres of the openings for the blade feet. The blades have studs which are inserted firmly between the two halves of the hub. This kind of construction does eliminate a thread on the foot of the blade, but the hub itself and the assembly of the bladed wheel remain complicated. Moreover, it is difficult to secure the blades evenly. Furthermore, this construction also requires screwed connections to join the two halves of the hub together.

One object of the invention is to provide a bladed wheel of the kind described, in which neither the hub nor the outer ring are split, and to develop this construction further in such a way that the bladed wheel is simple in construction and simple to assemble, and so that it can be assembled in particular without using screw-threaded connections.

This problem is solved by a bladed wheel having a clamping ring which clamps in place all the blades by pushing against the under faces of the blade feet, the blades resting with their annular flanges against either the hub or the outer ring, and thus pushing the blade feet against the hub or against the outer ring.

The main advantage of the bladed wheel according to the invention is based on the fact that a clamping element is used which clamps all the blade feet simultaneously. By using only a single clamping element, the construction of the bladed wheel is simple and assembly is easy.

For the attachment of the blades to the hub, or to the outer ring, or to the clamping element, there are in principle two arrangements, one of which is to provide the hub, the outer ring or the clamping element with apertures whose diameter is greater than the greatest diameter of the annular flange, and in that the annular flange takes support against the hub or against the outer ring or against the clamping element by means of an intermediate ring whose greatest diameter is greater than that of the apertures and whose smallest diameter is less than the greatest diameter of the annular flange. By the second method the hub or the outer ring or the clamping element has apertures whose diameter is less than that of the annular flange of the blade foot, and is greater than the greatest width of the blade. In assembling the first version the foot of the blade is inserted through the aperture, while in assembling the second version the free end of the blade is inserted through the aperture.

Further details and characteristics of the invention will be derived from the claims together with the following description and the attached drawings of embodiments of the invention, given as examples, wherein:

Figure 1:
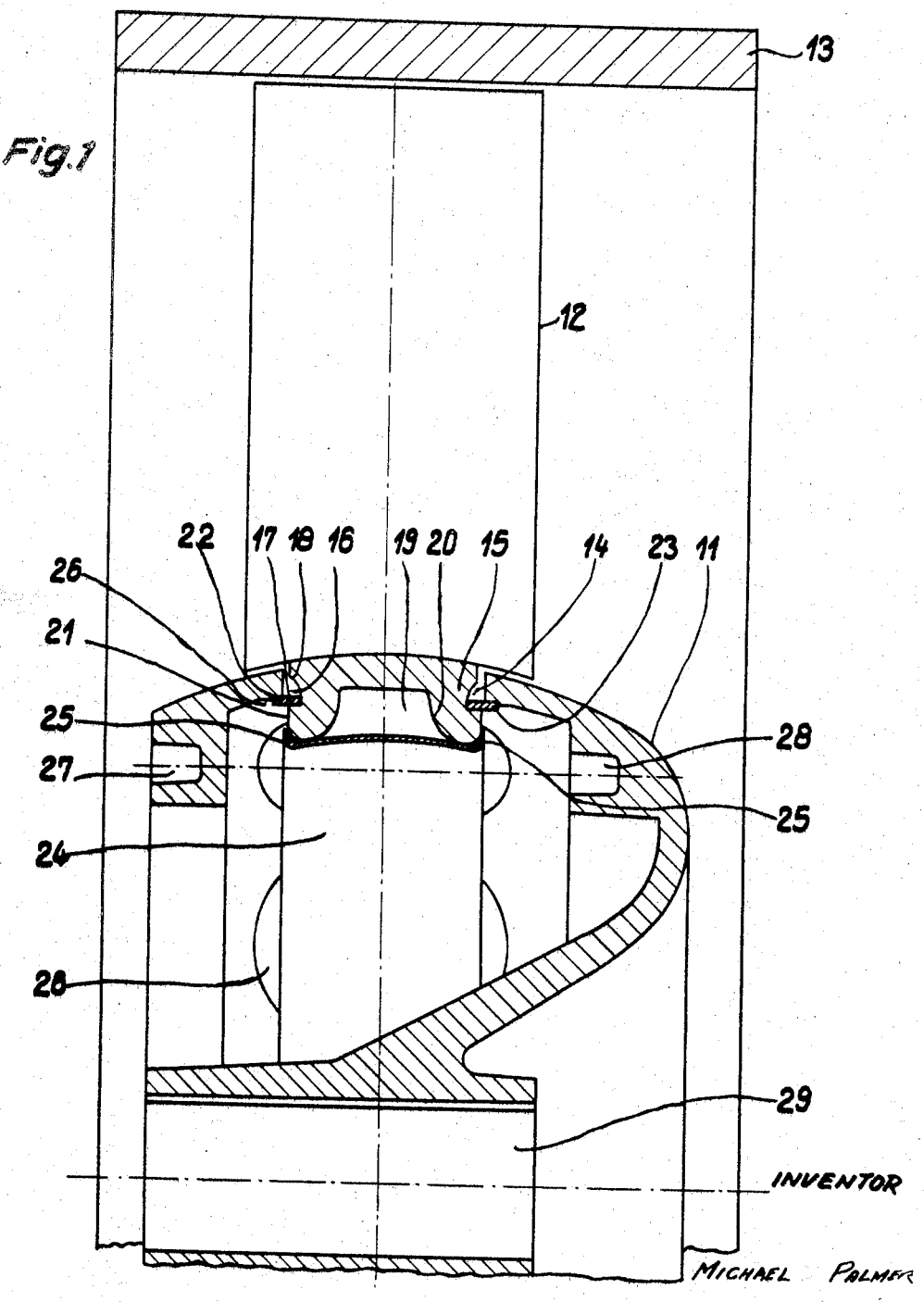
FIGURE 1 is a section through the upper part of a first embodiment of the bladed wheel according to the invention.
Figure 8:
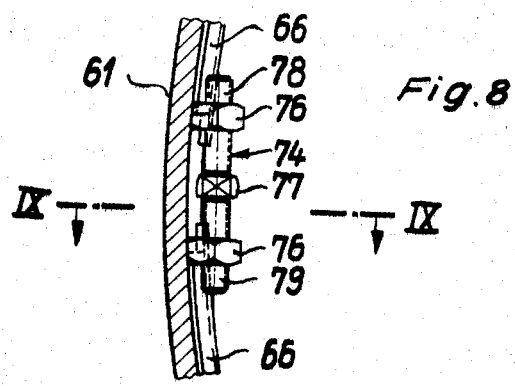
FIGURE 8 is an end view of a spreader device for the spreader ring used in the arrangement of FIGURES 5 to 7.
Figure 9:
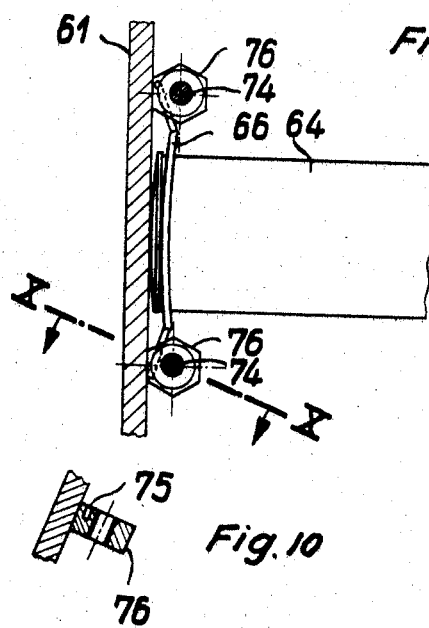
FIGURE 9 is a section along the line IX—IX of FIGURE 8.

In the drawings, FIGURE 1 shows hub 11 of a bladed wheel which, together with a number of blades 12 and an outer ring 13 constitutes a bladed wheel according to the invention. The hub 11 has apertures 14 in which feet 15 of the blades 12 are inserted. The foot of each blade has a peripheral groove 16 of which one surface 17 is flat and forms an annular flange, whereas the other surface 18 of the groove is in this version concave. The foot of the blade has a recess end in the form of recess 19 whose side surface 20 is curved and merges into the outer side surface 21 of the foot. Seated in the groove 16 there can for example be a spring ring 22 whose outer surface rests against a step 23 in the hub 11. A ring 24 of curved cross-section, which can be in two parts or can if desired simply be divided, pushes outwards against the under surface of the blade foot 15. The ring 24 has an upset edge 25 to locate it against axial displacement. The thrust of the ring 24 against the blade foot 15 can be adjusted within wide limits by means of an adjustment device which is not shown in FIGURE 1, but may generally approximate the spreading device of FIGURES 8 and 9, hereinafter described. Inner surfaces 26 of the hub, against which the spring ring 22 takes support, are, of course, flat.

The hub also has grooves 27 and 28 to accommodate compensating weights for balancing. The hub 11 is mounted on a shaft, for example the drive shaft of a motor, by means of sleeve 29.

The pressure with which the ring 24 pushes against the feet 15 of the blades is quite sufficient to keep the blades in their desired positions, due to the friction between the shoulder 17 and spring ring 22, and between the spring ring and the surface of step 23. Furthermore, when the bladed wheel is rotating the frictional lock is reinforced by centrifugal force.

Figure 2:
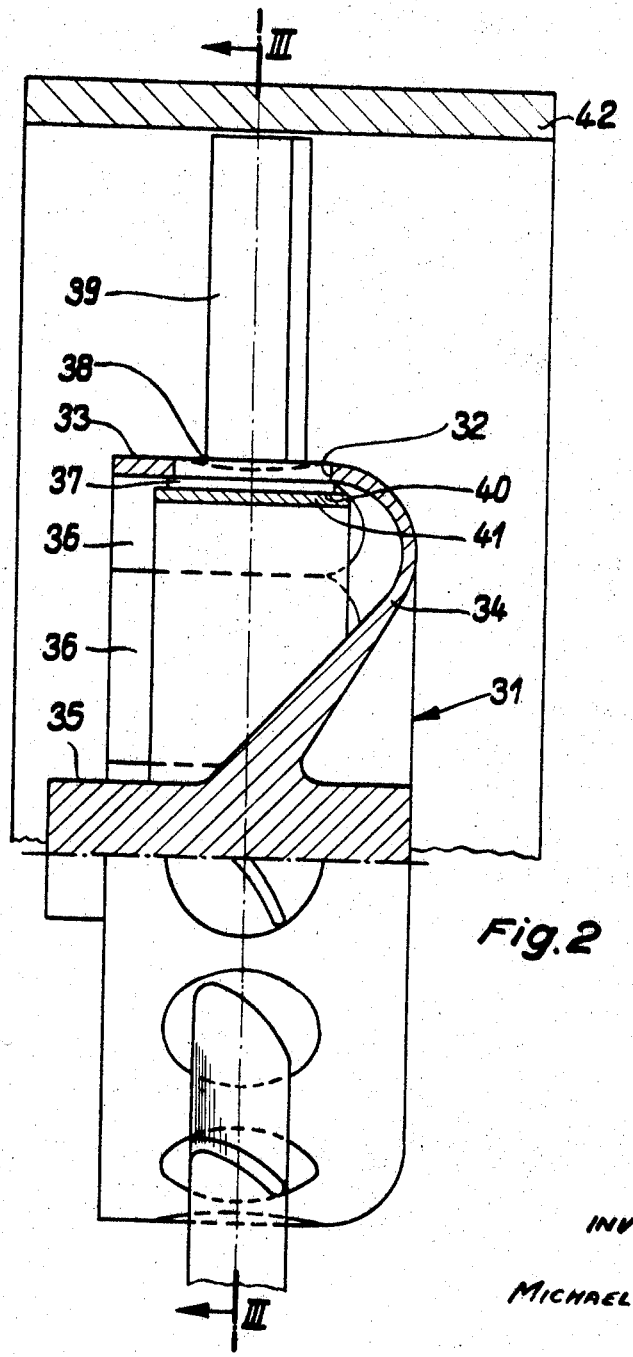
FIGURE 2 is a view of a second bladed wheel, partly sectioned.
Figure 3:
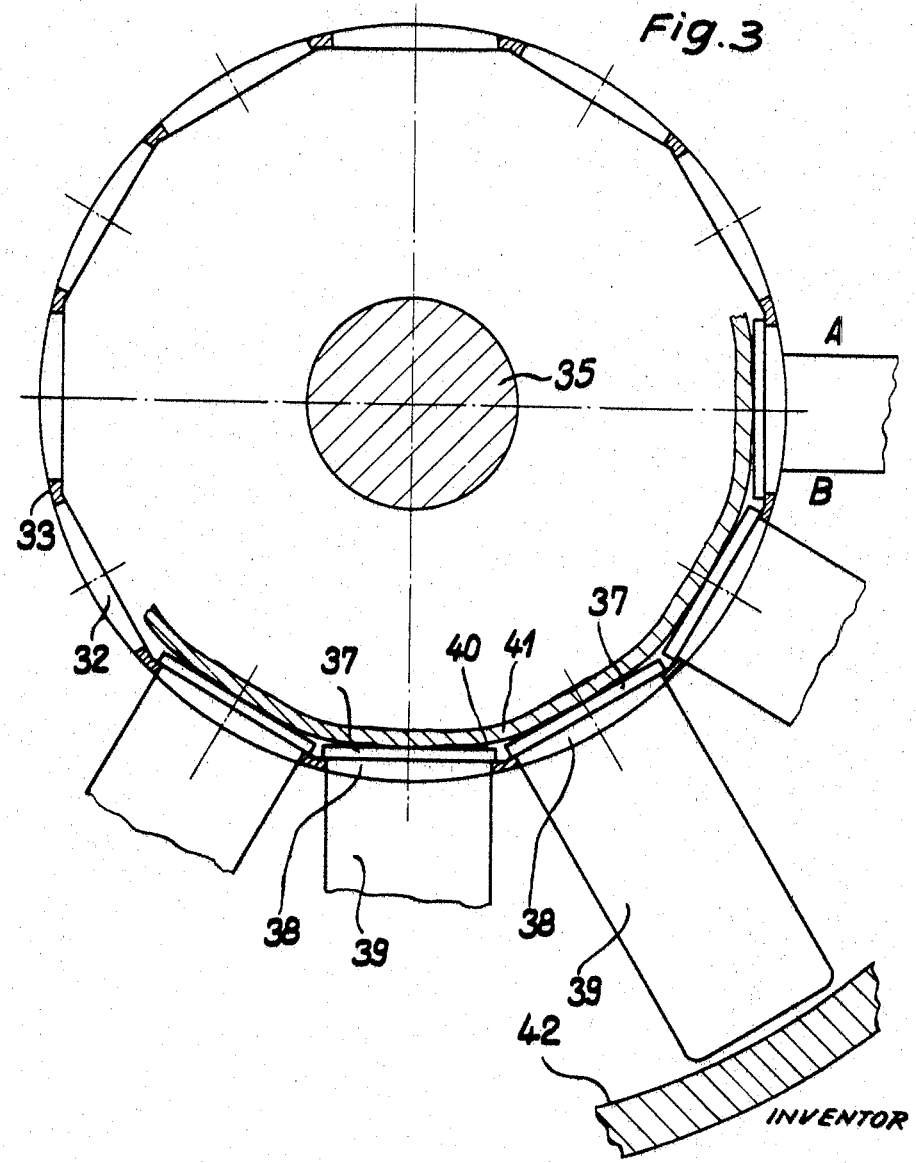
FIGURE 3 is a section through the bladed wheel of FIGURE 2 taken along the lines III—III in FIGURE 2.

In FIGURES 2 and 3, hub 31 is preferably made of aluminum alloy in one piece, and has circular openings 32 around its outer periphery. The outer cylinder 33 of the hub is connected to the inner part 35 of the hub, and merges into it, by means of the connecting web 34. The inner surface of the outer cylinder 33 of the hub is polygonal and the individual flat surfaces 36 of the polygon act as supports for the annular flanges 37 of the feet 38 of the blades 39. A resilient clamping ring 41 pushes against the inner surfaces 40 of the blade feet 38. The outer circumference of the clamping ring 41 is greater, as shown particularly in FIGURE 3, than the circumference of a circle tangent to the blade feet 38, and smaller than the circumference of the polygon defined by the surfaces 40 of the blade feet. The outer circumference of the clamping ring 41 is preferably half the sum of the circumference of this tangent ring and the circumference of this polygon. When a clamping ring of this kind has been driven into the hub 31 it takes up a shape approximating to the polygonal shape of the internal wall of the outer part of the hub.

The outer ring 42 can, of course, if desired, be replaced by a shaft or tube.

Figure 4:
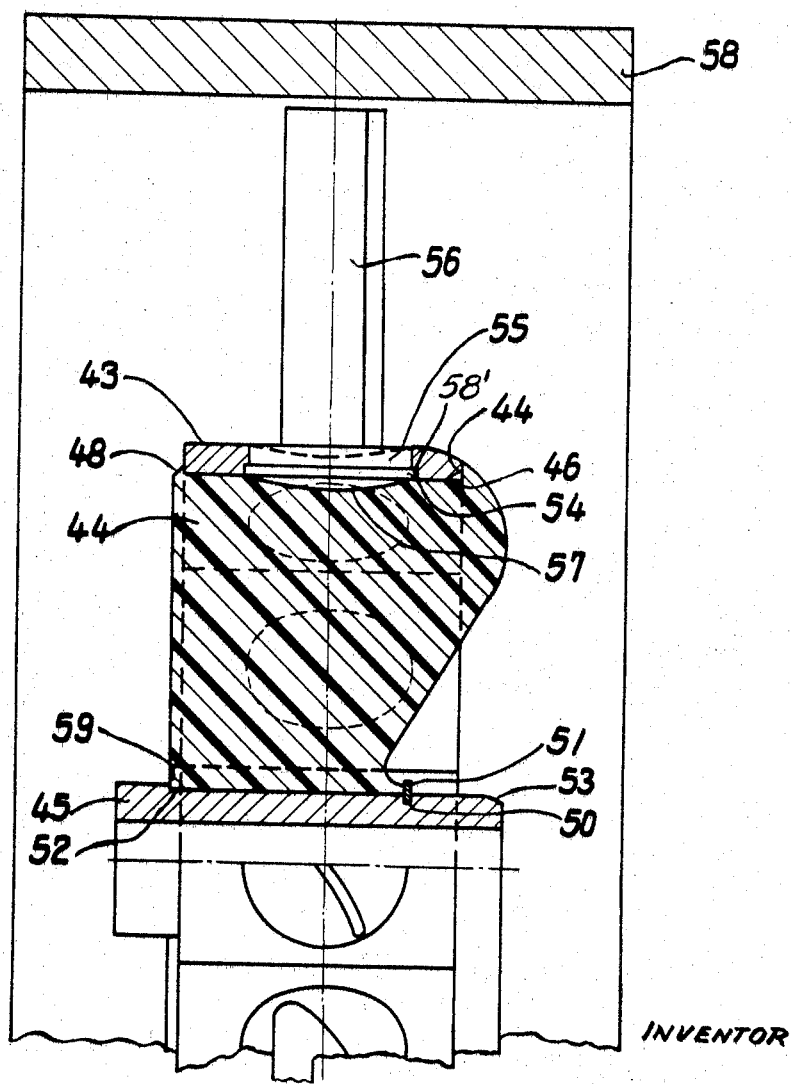
FIGURE 4 is a further and modified version of the bladed wheel.

FIGURE 4 shows a modified version in which the hub consists of three parts, that is to say, an outer cylinder 43, a ring 44 made of a plastic material and functioning as the clamping element, and a sleeve 45 made of a piece of tube.

Outer cylinder 43 is slightly chamfered off at its right-hand edge at 46 to facilitate forcing in plastic ring 44.

When the plastic ring 44 has been forced in, it rests with a shoulder against the edge of the outer cylinder 43, and is retained at the other end by a lip 48. The plastic ring 44 is located on sleeve 45 by a shoulder 59 and by a spring ring 51 which rests in a groove 50 in sleeve 45. To facilitate pushing the plastic ring 44 over the sleeve 45 the latter is slightly chamfered at 53 and the plastic ring is slightly chamfered at 52.

Annular flanges 54 of the feet 55 of the blades 36 having slightly domed end surfaces 57, also in order to facilitate insertion of the plastic ring 44. Annular flanges 54 are recessed in a recess 58' of the outer cylinder 43. However, this recess is unnecessary if the blade feet are suitably shaped. In this embodiment also outer ring 58 can be eliminated if the bladed wheel is housed in a cylindrical shaft.

Figure 5:
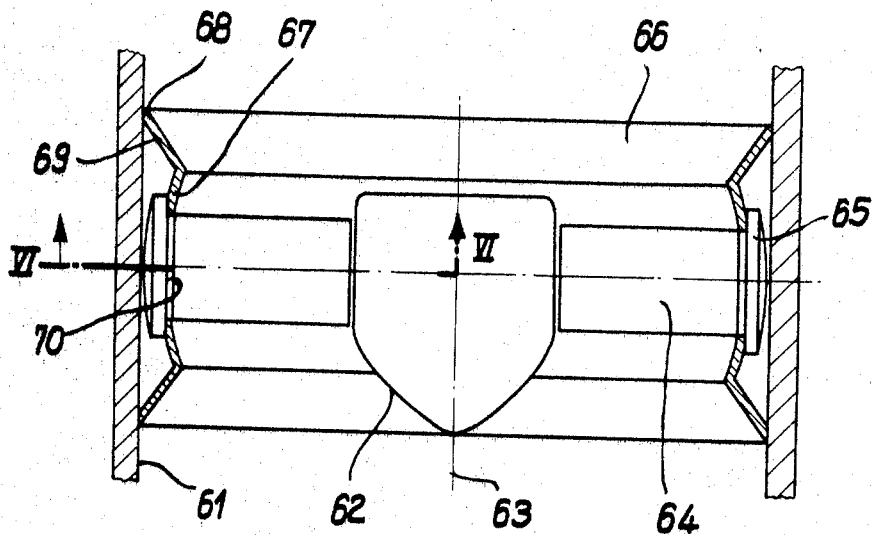
FIGURE 5 is a section through a bladed wheel in which the deflector blades are stationary.
Figures 6, 7:
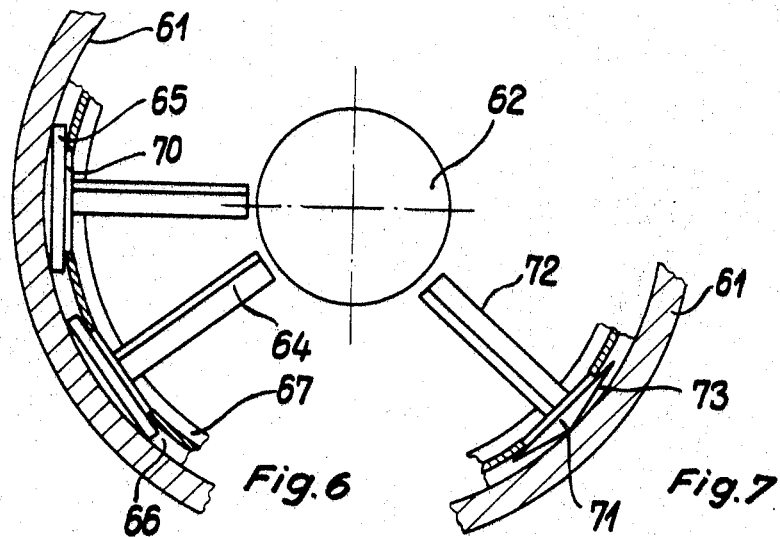
FIGURE 6 is a section along the line VI—VI of FIGURE 5.
FIGURE 7 is a section of a detail of a bladed wheel as represented in FIGURE 6 but with a modified blade foot.
Figure 10:
FIGURE 10 is a detail section along the line X—X of FIGURE 9.

FIGURES 5 and 6 show the wall 61 of a shaft in which a bladed wheel is mounted around hub 62. At 63 there is shown the middle axis of the bladed wheel, which consists substantially of a number of blades 64 manufactured without a cutting operation. Feet 65 of blades 64 have spherical under-surfaces whose radius of curvature is preferably half the diameter of the shaft. In this case there is a linear contact between feet 65 and wall 61 of the shaft. In order to allow adjustment of the blades into the desired position, there is a spreader ring 66 which has an inner part 67 containing openings and, contiguous with the inner part, two outer webs 69 which rest in contact with the supporting wall 61. The openings in inner part 67 house extensions 70 of the blade feet 65. Spreader ring 66, which can if desired be spread open by spreading devices shown in FIGURES 8 to 10, can be manufactured in a very simple way from a flat strip of sheet metal, which is first holed, then rounded and finally given flanged edges.

In the modified version of a bladed wheel according to the invention shown in FIGURE 7, foot 71 of blade 72 has a conical surface 73. This surface makes a point contact with the wall 61, but here again, as in the versions of FIGURES 5 and 6, the friction between the blade and the wall of the shaft is enough to keep the blade in its desired position.

For spreading, spreader ring 66, there is a spreading device consisting of two coaxial bolts 74 on which are screwed nuts 76 which have slots 75. Bolts 74 have a central square or hexagonal driving part 77 allowing the bolts to be turned by means of a spanner. Two ends 78, 79 of the bolts have screw-threads running in opposite directions, so that when the bolt 74 is rotated the nuts 76 move in opposite directions. When the nuts 76 on a bolt 74 move away from each other the ring 66 is spread open, because its ends engage with the slots 75 in the nuts 76. The nuts 76 cannot rotate with the bolt 74 because the spreader ring 66, as shown particularly in FIGURE 9, prevents this. The slots 75 run diagonally with respect to those surfaces of the nuts 76 which rest in contact with the supporting wall 61, to ensure that the spreader device is held firmly by the spreader ring 66.

The spreader device according to the invention has the advantage of very simple manufacture, because most of the parts are standard engineering parts which can easily be adapted to this special purpose, as is obvious for example in the case of the nuts 74. Moreover, the spreader device functions in an effective and convenient manner.

There are, of course, many possible variations within the scope of the invention. For example, there may be used a guide wheel construction in which the blades are inserted through openings in the outer ring and obtain support from the outer surface of the outer ring by contact between the annular flange of the blade and a supporting surface. In this embodiment, a closed clamping ring would be used for clamping the blades in place, the clamping ring surrounding the outer ring and pressing against the inner surfaces of the blade feet. In this case the clamping ring would not be stressed in compression, as in the embodiment described above, but would be stressed in tension. It would, of course, in principle, also be possible to hold the blades firmly against the outer surface of the outer cylinder of a hub by means of a ring stressed in tension and containing openings. However, this solution has the disadvantage that the centrifugal forces arising during rotation of the bladed wheel operate to loosen the clamping ring.

I claim:
1. A bladed wheel assembly for fans including a hub and an outer ring encircling and spaced from said hub, a plurality of blades mounted between said hub and ring, said hub and ring being adapted to support said blades at one end only thereof, each of said blades having a foot formed with an annular flange, a spring clamping ring arranged within said assembly and relative to said hub and ring, said clamping ring engaging said flanged feet and exerting pressure thereagainst to thereby clamping said feet and blades relative to said hub and outer ring.

2. A bladed wheel according to claim 1, wherein the hub has apertures whose diameter is greater than the greatest diameter of the annular flange, and wherein the annular flange takes support against the hub by means of an intermediate ring whose greatest diameter is greater than that of the apertures and whose smallest diameter is less than the greatest diameter of the annular flange.

3. A bladed wheel according to claim 2, wherein each blade foot is in the form of a short stud which has a recesss in its end.

4. A bladed wheel according to claim 3, wherein the annular flange is a surface, facing the outer end of the blade, of a groove in the blade foot.

5. A bladed wheel according to claim 2, wherein the intermediate ring rests with its outer edge in a stepped recess in the hub.

6. A bladed wheel according to claim 1, wherein the hub has apertures whose diameter is less than that of the annular flange of the blade foot, and is greater than the greatest width of the blade.

7. A bladed wheel according to claim 6, in which the blade feet, which project through holes in the clamping element, are pushed against the outer ring, wherein the surface of the blade foot facing the outer ring is spherical.

8. A bladed wheel according to claim 6, in which the blade feet, which project through openings in the clamping element, are pressed against the outer ring, wherein the surface of the blade foot facing the outer ring is conical.

9. A bladed wheel according to claim 6, wherein the clamping element is a spreader ring which has an inner part which bulges out towards the outer ring and has openings to accommodate the blades, and has flanges whose ends rest in contact with the outer ring.

10. A bladed wheel according to claim 9, wherein the spreader ring is made of a flat strip of sheet metal which is first holed, then rounded and finally given two flanges.

11. A bladed wheel according to claim 6, in which the hub has openings through which the blades project, wherein the peripheral part of the hub containing the openings has a polygonal inner surface whose individual flats act as supports for the annular flanges of the blade feet.

12. A bladed wheel according to claim 11, wherein the clamping element is a resilient spring ring whose circumference is greater than that of a circle internally tangent to the blade feet and smaller than the circumference of the polygon defined by the surfaces of the blade feet.

13. A bladed wheel according to claim 11, wherein the hub is a casting comprising an inner sleeve, a ring with a polygonal inner surface, and a web connecting the sleeve to the ring, this web extending between the edge of the ring and the sleeve and merging into the hub approximately in the plane containing the centres of the apertures.

14. A bladed wheel according to claim 13, wherein near the edge of the ring the web has the shape of the usual kind of streamlined cap, making the latter unnecessary.

15. A bladed wheel according to claim 11, wherein the clamping element is an elastic body of a plastic material which, in conjunction with a sleeve pressing into the central bore of the plastic body, and a ring which is polygonal at least inside and has openings to take the blades and is pushed over the plastic body, forms the hub.

16. A bladed wheel according to claim 14, in which the clamping element is a split spreader ring, and the spreader ring has a device for spreading it by means of threaded bolts.

17. A bladed wheel according to claim 16, wherein the spreader device consists of two threaded bolts arranged substantially parallel to each other and having opposite threads on their opposite ends to take threaded nuts, each nut having a slot for holding the end of the spreader ring.

18. A bladed wheel according to claim 17, wherein the bolt has a driving part by means of which the bolt can be rotated.

19. A bladed wheel according to claim 18, wherein the slots run at an angle to those surfaces of the nut which rest in contact with the outer ring.

References Cited

UNITED STATES PATENTS 2,857,093  10/1958  Warnken _____ 230—133

FOREIGN PATENTS 710,633  6/1965  Canada.
341,486  6/1904  France.
572,859  10/1945  Great Britain.
741,036  11/1955  Great Britain.

DONLEY J. STOCKING, *Primary Examiner.*

HENRY F. RADUAZO, *Assistant Examiner.*

U.S. Cl. X.R.

230—133